Nov. 30, 1937.  J. H. COX  2,100,321
TIRE INFLATION DEVICE
Original Filed July 17, 1933
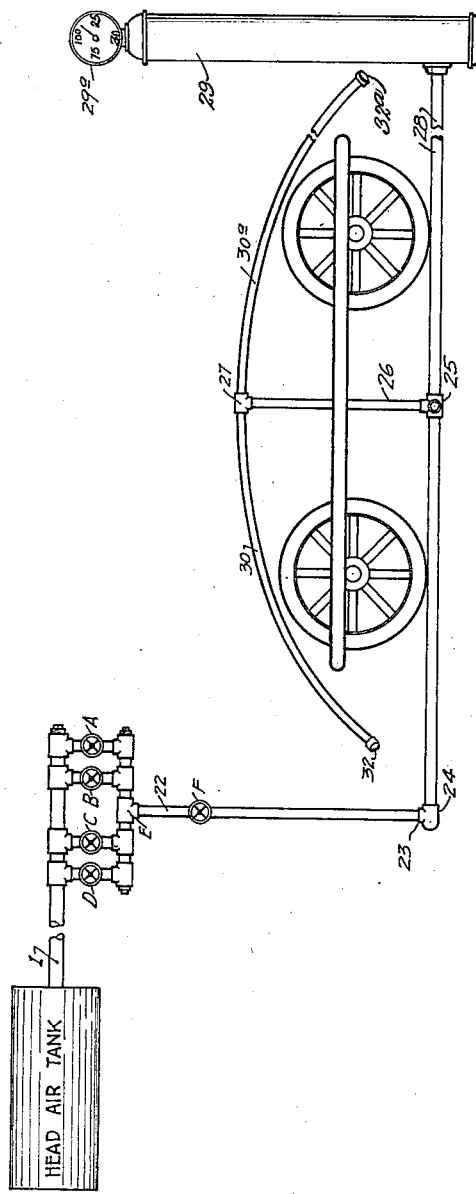
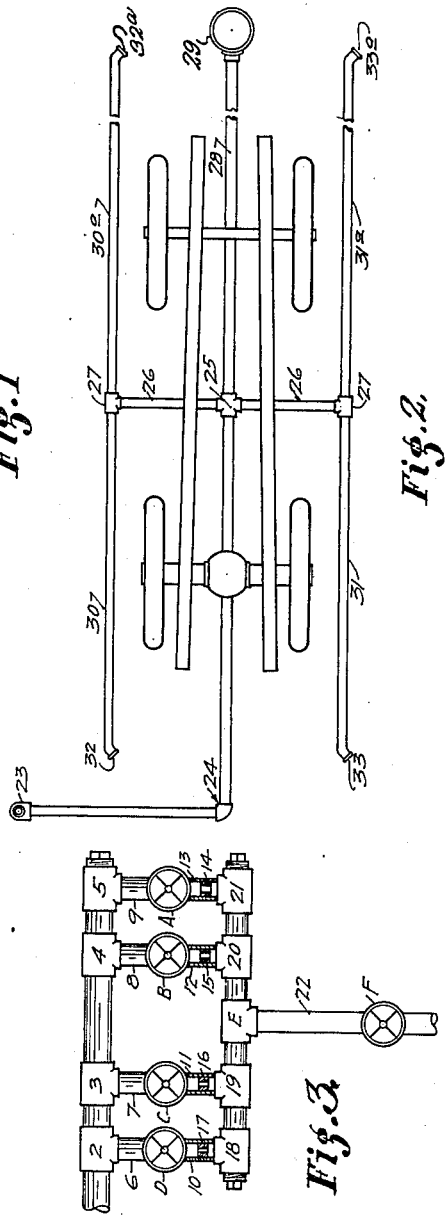
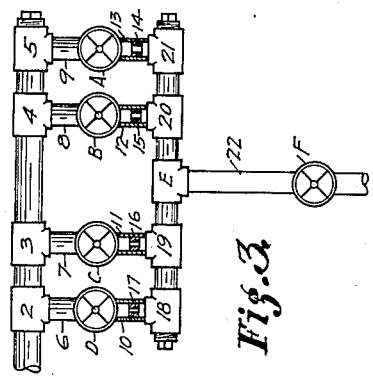
Inventor
James H. Cox
Witness
J. Wallace McKee
Chas. L. Smith
By
Attorney Patented Nov. 30, 1937

2,100,321

UNITED STATES PATENT OFFICE.

2,100,321

TIRE INFLATION DEVICE

James H. Cox, Los Angeles, Calif.

Application July 17, 1933, Serial No. 680,820
Renewed February 23, 1937

7 Claims. (Cl. 221—73.5)

My invention relates to fluid pressure systems, and more particularly to an apparatus, simple and economical in construction, easy and inexpensive to install, in which it is possible to convey equalized fluid pressures to one or more devices, irrespective of any fluctuating pressures in the source of the fluid, said apparatus also, if desired, including a means for indicating continuously at all times the pressure of said conveyed fluid.

It accordingly is an object of my invention to provide a novel system or apparatus for conveying compressed fluid from any suitable source to one or more receivers, or a set of such receivers, such as the tires of a motor vehicle, whereby said receivers or tires may be simultaneously inflated or deflated and the pressures therein maintained equal. Preferably, I lead a main pipe or conduit from the compressed-fluid source to a reservoir and, between the said source and reservoir, provide one or more branch pipes or conduits leading from the main conduit to the respective receivers or tires, to which they may be removably connected. The reservoir and the receivers or tires are all of substantially the same volumetric capacity, and the compressed fluid is admitted to all of them through restricted apertures of substantially the same size, so that the pressure of the fluid in all of the receivers or tires and in the reservoir is equal. By attaching a suitable means, such as a conventional or other pressure gauge, to the reservoir, the operator is apprised at all times of the pressure existing not only in the reservoir but in each of the receptacles or tires.

It is also within the province of my invention to provide a novel means, such as a valve controlled set of plugs of varying dimensions, whereby the number of devices or tires to be uniformly inflated or deflated may be varied.

The above, and further objects and advantages of my invention, as will hereafter more fully appear, I attain by the construction described in the specification and illustrated on the drawing, forming a part of my application.

Reference is had to the accompanying drawing, in which similar reference characters denote similar parts.

In the drawing,

Fig. 1 is a side elevation of my invention disclosed in more or less diagrammatic form, Fig. 2 is a part sectional and part top plan view of Fig. 1, and Fig. 3 is an enlarged fragmentary part sectional and part elevational view of the apparatus for varying the pressure of the fluid passing to the receivers or tires.

Describing my invention more in detail, I may provide any suitable source of pressure fluid, such as designated on the drawing as the head air tank, from which is led a suitable pipe 1 having associated therewith the T-couplings 2, 3, 4 and 5 to which are connected in any preferred way the connections 6, 7, 8 and 9, which in turn are connected through the pipes 10, 11, 12 and 13 to a pipe preferably parallel to the pipe 1 by means respectively of the T-couplings 18, 19, 20 and 21. Intermediate the pipes 6, 7, 8 and 9 and the pipes 10, 11, 12 and 13 are respectively positioned the control valves A, B, C and D, the purpose of which will be presently explained.

Positioned within the pipe connections 10, 11, 12 and 13 are respectively the calibrated plugs or nipples 17, 16, 15 and 14, the purpose of which will also be presently explained.

Connected to the pipe preferably parallel with the pipe 19 by the member E is a pipe 22 in which may be positioned the combined control and fluid exhaust valve F, which valve is adapted to control the pressure equalizing system or apparatus, and also to relieve the pressure therefrom, said pipe by any suitable means, such as the elbow 23 connecting a pipe by means of the elbow 24 to a preferably central pipe 28 leading to the pressure reservoir or receptacle 29, which is equipped with a suitable pressure gauge or indicating means 29ª of conventional or other form.

The pipe 28 may be provided preferably intermediate its length with a fourway coupling 25 connecting by means of the longitudinal and vertical branch pipes 26 to the preferably longitudinally extending hose connections 30, 30ª, 31 and 31ª by means of the T-connections 27, the free end of each of said hose connections being provided with the chuck clip couplings 32, 32ª, 33 and 33ª adapted to be detachably associated with the pneumatic devices or tires of the motor vehicle, the chassis and tires of which are more or less diagrammatically shown in Figs. 1 and 2.

The apertures of the detachable couplings 32, 32ª, 33 and 33ª are substantially of the same size as the aperture in the end of the pipe 28 connecting with the pressure reservoir or receptacle 29 so that the pressure in the devices or tires will be identical with that in the reservoir or receptacle 29. In practice the reservoir or receptacle 29 is substantially of the same capacity as the devices or tires, and the apertures in the piping leading to said reservoir or receptacle and to said devices or tires are also substantially of the same size. Hence the pressure is equalized within said reservoir or receptacle and throughout the apparatus or system and the reading of the gauge or indicating means 29ª continuously indicates accurately and exactly the pressure throughout the system as said devices or tires are being inflated or deflated, irrespective of any sudden rise or fall of the pressure in the system.

If desired, the size of the various apertures or the capacity of the reservoir or receptacle 29 may be varied to accord with any varying conditions met in practice.

Depending upon the number of devices or tires to be inflated, but one valve A, with its calibrated plug or nipple 17 may be used, or valves A and B may be used, or A, B and C or all four A, B, C, and D, so that one or more devices or tires may be inflated as desired. If preferred, moreover, the structures depicted in Fig. 3 may be omitted entirely, the system being then controlled solely by the combined control and exhaust or relief valve F. It will thus be seen that the gauge or indicating means 29ª will at all times indicate exactly the pressure in all of the devices or tires, irrespective of the number to be inflated, and will accurately and exactly indicate continuously the pressure conditions in all of said devices or tires.

In accordance with the provisions of the patent statutes, I have described the principle of operation of my invention together with the system and apparatus which I now consider to represent the best embodiment thereof; but I desire to have it understood that the system and apparatus shown are only illustrative and that the invention can be carried out by other means and ways.

I claim as my invention:—

1. In a tire inflating and deflating mechanism, the combination of a source of pressure fluid, a reservoir, a pipe line connecting said source and reservoir, a plurality of sets of fluid-conducting pipes adapted to be detachably connected with the tires, and branch pipes connecting the said pipe line with the respective sets of fluid-conducting pipes, for the purpose specified.

2. An apparatus of the class described comprising a source of pressure fluid, a fluid-conducting pipe extending from said source, means for connecting said pipe with a fluid receiving device, and a reservoir connected with said pipe, said reservoir having substantially the same volumetric capacity as the fluid receiving device, the connections between the said pipe and the reservoir and between the pipe and the fluid-receiving device having substantially the same conductive capacity, whereby, when the pressure fluid is permitted to flow in said pipe the receiving device and the reservoir will be inflated or deflated at the same rate and to the same pressure.

3. An apparatus as set forth in claim 2 in which the reservoir is provided with means for indicating the pressure within the same and the equal pressure within the receiving device.

4. An apparatus of the class described comprising a source of pressure fluid, a fluid-conducting pipe assembly connected with said source, means for connecting said assembly with a plurality of pneumatic tires, a closed reservoir also connected to the pipe assembly and having a volumetric capacity substantially equal to that of one of the tires, the connections between the pipe assembly and the tires and between the said assembly and the reservoir having substantially the same conductive capacity whereby, when the pressure fluid is permitted to flow in the pipe assembly, the several tires and the reservoir will be inflated or deflated and to the same pressure, and means connected with the said reservoir for indicating at every moment the pressure then present in the tires.

5. An apparatus of the class described comprising a source of pressure fluid, a closed reservoir, a main pipe connecting the said source and reservoir, a valve in said main pipe, branch pipes connected with said main pipe between the valve and the reservoir, means for removably connecting said branch pipes to a plurality of pneumatic tires, each of said tires having substantially the same volumetric capacity as the said reservoir and the passage from the branch pipes into the respective tires and from the main pipe into the reservoir being of substantially the same conductive capacity whereby, when the valve is moved from its normally closed position the tires and reservoir are simultaneously inflated or deflated to the same degree, and means connected with the reservoir for indicating at every moment the pressure then present in the tires.

6. An apparatus of the class described comprising a source of pressure fluid, a fluid conducting pipe extending from said source, means for attaching the pipe to a receiver of the pressure fluid, said means having an aperture through which the fluid flows into the receiver, a reservoir connected with said pipe and having an aperture through which the fluid flows and valve means in said pipe for controlling the flow of the fluid to said receiver and reservoir, the volumetric capacities of the receiver and reservoir having substantially the same ratios one to the other as have the fluid-conductive capacities of the apertures through which the fluid flows to the receiver and reservoir respectively, whereby the pressures in the receiver and reservoir will be maintained the same.

7. An apparatus as set forth in claim 6 in which the reservoir is provided with means for indicating the pressure therein.

JAMES H. COX.